(12) United States Patent
Wohltmann et al.

(10) Patent No.: US 8,126,613 B2
(45) Date of Patent: Feb. 28, 2012

(54) VEHICLE SAFETY SYSTEM

(75) Inventors: Dirk Wohltmann, Birmingham, MI (US); Thomas Wolf, Bloomfield Hills, MI (US)

(73) Assignee: WABCO GmbH, Hannover (DE)

( * ) Notice: Subject to any disclaimer, the term of this patent is extended or adjusted under 35 U.S.C. 154(b) by 770 days.

(21) Appl. No.: 12/229,702

(22) Filed: Aug. 25, 2008

(65) Prior Publication Data

US 2010/0049406 A1 Feb. 25, 2010

(51) Int. Cl.
*G06F 7/00* (2006.01)

(52) U.S. Cl. ........................................... 701/46; 701/45

(58) Field of Classification Search .................. 701/46, 701/45; 280/735, 5.519
See application file for complete search history.

(56) References Cited

U.S. PATENT DOCUMENTS

| | | | |
|---|---|---|---|
| 6,370,461 B1 * | 4/2002 | Pierce et al. | 701/45 |
| 6,519,519 B1 * | 2/2003 | Stopczynski | 701/45 |
| 7,561,951 B2 * | 7/2009 | Rao et al. | 701/48 |
| 7,848,884 B2 * | 12/2010 | Kawasaki | 701/301 |
| 7,922,196 B2 * | 4/2011 | Le et al. | 280/735 |
| 2003/0009270 A1 * | 1/2003 | Breed | 701/29 |
| 2006/0109094 A1 * | 5/2006 | Prakah-Asante et al. | 340/435 |

* cited by examiner

*Primary Examiner* — Drew Brown
(74) *Attorney, Agent, or Firm* — Kramer Levin Naftalis & Frankel LLP

(57) ABSTRACT

A vehicle safety system comprising a vehicle stability-regulating system, one or more secondary safety components and an electronic interface. The electronic interface communicates with both the vehicle stability-regulating system and the secondary safety components. The electronic interface receives data from the vehicle stability-regulating system and controls the operating condition of the secondary safety components based thereon.

20 Claims, 4 Drawing Sheets

VEHICLE SAFETY SYSTEM

BACKGROUND OF THE INVENTION

The present invention relates generally to safety systems for vehicles, such as, for example, trucks or tractor-trailer combinations.

Vehicle safety systems and components serve the salutary purpose of protecting vehicle occupants. Examples of conventional vehicle safety components include "passive" restraints such as, for example, seat belts and airbags. Vehicle stability-regulating systems, which actively influence the control of the vehicle and, thus, the vehicle dynamics, represent more technically sophisticated "active" safety solutions. Such stability-regulating systems include electronic stability control ("ESC") systems. ESC systems are typically equipped with various sensors in order to detect the status of the vehicle, for example by detecting the longitudinal acceleration and the lateral acceleration of the vehicle. ESC systems analyze these data and decide if and how the vehicle dynamics will be influenced, for example automatically braking the inner rear wheel to counter understeer.

SUMMARY OF THE INVENTION

Generally speaking, it is an object of the present invention to provide an improved vehicle safety system which leverages both the vehicle's stability-regulating system and secondary safety components to improve the vehicle's passive safety capabilities through operative coordination with the vehicle's active safety capabilities.

In accordance with embodiments of the present invention, an electronic interface is provided in communication with and to effect communication between the vehicle's stability-regulating system and secondary safety components. The secondary safety components can operate under normal conditions and safety conditions. The electronic interface is constructed, configured and arranged to set the condition for the secondary safety components based on regulating variable data received from the vehicle stability-regulating system. The regulating variable data available to the vehicle stability-regulating system are used to control the secondary safety components.

According to one embodiment of the present invention, the vehicle stability-regulating system is an ESC system designed to deliver data concerning the vehicle's longitudinal acceleration, lateral/transverse acceleration, as well as distance to another object (including activation of a distance warning signal), activation of a stability regulator and/or stability-regulating system failure. Based on these regulating variable data, one or more secondary safety components are activated in advance of or during the early stages of an accident or other dangerous condition, or are otherwise made ready to effect appropriate action. This is referred to herein as a "safety" condition, as opposed to the "normal" condition characterized by little or no indication of a dangerous situation. For example, the point of "no return" (i.e., when the vehicle is no longer controllable) can be recognized by the ESC system in advance of an accident, and suitable measures, such as, for example, tightening the seat belts, can be implemented in order to reduce the danger of injury to vehicle occupants.

The electronic interface establishes the link between the vehicle stability-regulating system and the secondary safety components. The electronic interface controls the secondary safety components based on the regulating variable data collected by the vehicle stability-regulating system. The electronic interface may be a separate electronic device, or, alternatively, it can be integrated into the vehicle stability-regulating system, the secondary safety components or both.

According to a preferred embodiment of the present invention, the secondary safety components comprise a seat belt tightener and/or a seat adjuster. The seat belt tightener and/or the seat adjuster can be actuated by means of actuators, which can be activated by the electronic interface. Preferably, the electronic interface and the secondary safety components can achieve both tightening of the seat belts and adjustment of the seats, but effectuation of only one of these safety measures is also contemplated by the present invention.

The secondary safety components can be transitioned from the normal condition into the safety condition (or vice-versa), in continuous fashion or, alternatively, through a series of one or more discrete steps. Additionally, the inventive safety system can operate through a combination of stepwise and continuous regulation.

In one embodiment of the present invention, the secondary safety components can occupy one or more transitional conditions between the normal condition and the safety condition. The electronic interface regulates the secondary safety components, on the basis of the regulating variable data, to occupy such transitional conditions. The secondary safety components can therefore be switched into the safety condition by moving through one or more of the transitional conditions, instead of immediately transitioning from the normal condition to the safety condition. For example, the inventive safety system causes a seat belt tightener to tighten seat belts to varying degrees based on the regulating parameters.

In a preferred embodiment of the present invention, the electronic interface effects the transition of the secondary safety components to the safety condition when one or more preselected threshold values for one or more regulating variables are reached. The threshold value or values can represent the point of "no return," the condition in which the vehicle is no longer controllable.

Accordingly, it is an object of the present invention to leverage in a coordinated fashion the capabilities of the vehicle's existing stability-regulating system and secondary safety components, to increase comfort and driving safety, and to reduce the risk and severity of injury to vehicle occupants in the event of accident.

Still other objects and advantages of the present invention will in part be obvious and will in part be apparent from the specification.

The present invention accordingly comprises the features of construction, combination of elements, and arrangements of parts which will be exemplified in the constructions hereinafter set forth, and the scope of the invention will be indicated in the claims.

BRIEF DESCRIPTION OF THE DRAWINGS

For a fuller understanding of the present invention, reference is had to the following description taken in connection with the accompanying drawings in which.

DETAILED DESCRIPTION OF THE PREFERRED EMBODIMENTS

In accordance with embodiments of the present invention, an improved safety system for a vehicle is provided. The present invention leverages the vehicle's existing vehicle stability-regulating system and secondary safety components and provides an electronic interface in communication with the vehicle stability-regulating system and the secondary safety components to effect informed control and improved utilization of the secondary safety components.

The electronic interface, which establishes a link between the vehicle stability-regulating system and the secondary safety components, receives regulating variable data from the vehicle stability-regulating system and uses the data to appropriately control the secondary safety components. The electronic interface may be a separate electronic device, or, alternatively, it may be integrated into the vehicle stability-regulating system, the secondary safety components or both. As discussed in greater detail below, the electronic interface can receive a variety of regulating variable data from the vehicle stability-regulating system and can employ a variety of regulating schemes to use such data to control the secondary safety components.

Examples of vehicle stability-regulating systems include anti-lock brake systems (ABS), collision mitigation systems (CMS), ESC, lane departure warning (LDW) systems, roll stability control (RSC) systems and tire pressure monitoring (TPM) systems. Examples of secondary safety components include occupant restraints such as seat belt tensioners, seat locking devices, seat adjustment devices and airbags. The foregoing examples of vehicle stability-regulating systems and secondary safety components are not intended to be exhaustive.

Generally speaking, vehicle stability-regulating systems are "active" systems which measure conditions and calculate signals that are used to detect and prevent dangerous or unstable vehicle conditions. Vehicle stability-regulating systems are designed to support the driver under these circumstances, for example by taking action to restore the vehicle to a controllable condition. The values detected (measured and/or calculated) by the vehicle stability-regulating systems are desirably checked for integrity and plausibility and proven by fault detection functionalities within the vehicle stability-regulating system. Data provided by vehicle stability-regulating systems can include, for example, continuous values such as (i) longitudinal acceleration, (ii) lateral acceleration, (iii) vehicle yaw deviation/slip angle, (iv) vehicle yaw rate, (v) steering wheel angle, (vi) time to collision, as well as discrete trigger point signals such as, for example, (i) lane departure warning signals, (ii) distance alert signals, (iii) yaw brake control signals, (iv) yaw engine control signals, (v) roll brake control signals, and/or (vi) roll engine control signals.

Figure 1:
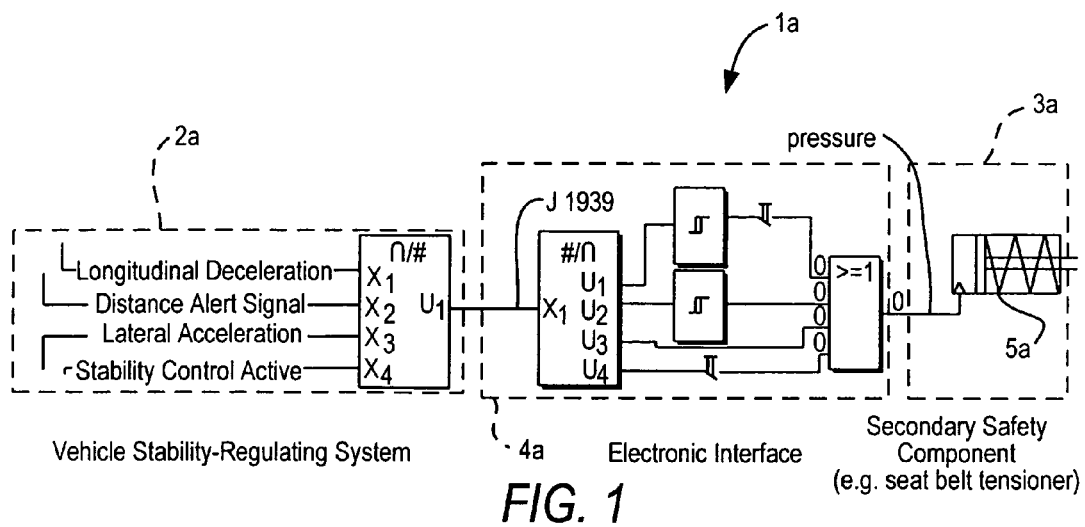
FIG. 1 is a schematic diagram of a vehicle safety system in accordance with one embodiment of the present invention including a separate vehicle stability-regulating system, secondary safety component and electronic interface.

Referring now to the drawing figures, where like reference numbers are used for corresponding parts, FIG. 1 is a schematic diagram of a vehicle safety system 1a in accordance with one embodiment of the present invention. System 1a includes a vehicle stability-regulating system 2a, at least one secondary safety component 3a and an electronic interface 4a, which communicates with stability-regulating system 2a and secondary safety component 3a.

Stability-regulating system 2a can be, for example, a conventional ESC system capable of delivering vehicle regulating variable data, such as, for example, longitudinal acceleration, lateral acceleration, yaw, yaw rate, steering angle, a distance warning signal, an activation of a stability regulator signal and a stability-regulating system failure signal.

According to the embodiment of the present invention depicted in FIG. 1, secondary safety component 3a includes seat belts having belt tighteners and vehicle seats having seat adjusters. The seat belt tighteners and seat adjusters are equipped with actuators 5a by which each can be actuated from a normal condition into a safety condition. The normal condition is the condition appropriate for use when no or immaterial signs of danger are detected, while the safety condition is appropriate for use when material signs of danger are detected.

Seat position is preferably dependent upon the trigger for the safety condition. For example, when a frontal crash is expected, the safety condition is desirably characterized by the seat belts being tightened to the maximum extent by the seat belt tighteners and the vehicle seats being moved to the extreme rear seat position and being locked there by the seat adjusters. For stability control events, the seats are desirably placed in upright and locked position to support the occupants and provide the best position and support to enable the driver to steer and react to control the vehicle. The normal condition is characterized by the seat belts being tightened only to a minimal degree and the vehicle seats being unlocked and disposed in positions selected by the vehicle occupants.

In accordance with the present invention, electronic interface 4a is constructed, configured and arranged to function as the link between the vehicle's stability-regulating system 2a and secondary safety component 3a. The electronic interface 4a receives regulating variable data from the vehicle stability-regulating system 2a. The electronic interface evaluates the received data to identify dangerous situations and appropriately controls the operating condition of secondary safety component 3a, which in the present example is a seat belt tightener. Desirably, the electronic interface can receive regulating variable data from more than one vehicle stability-regulating system to control the operating condition of more than one secondary safety component.

As discussed above, in accordance with the present invention, a variety of regulating variables can be used by the electronic interface. Illustrative examples of such regulating variables and associated control schemes are discussed in greater detail hereinafter.

Longitudinal acceleration ($a_l$): During longitudinal deceleration (negative acceleration), the vehicle driver and other occupants experience movement caused by inertia. In the event of a substantial deceleration, especially caused by a vehicle crash, such movement can result in injury. Changes in longitudinal deceleration can be detected by vehicle stability-regulating systems, such as an ABS, or caused by active braking by the driver or the vehicle stability-regulating system, such as an RSC system. The longitudinal acceleration/ deceleration signal can be used to alert the driver and/or to adjust the seat position and seat belt tension in order to prevent injuries or loss of control.

Lateral acceleration ($a_q$)/extended vehicle yaw rate/slip angle/steering angle: Lateral acceleration can build up under high friction road conditions potentially leading to roll over situations, especially with vehicles such as, for example, trucks having high centers of gravity. An increase in the vehicle yaw rate indicates a loss of stability and can lead to decreased vehicle control and crash situations. Changes in the yaw angle are determined by comparing the vehicle yaw rate to the driver's turning demand (slip angle). An increase in yaw rate and steering angle or an increase in the yaw angle as compared to the driver's turning demand over time indicates a dangerous condition. If such conditions are detected, the seat belts can be tightened by the seat belt tensioners to protect vehicle occupants by securing them in their seats. This also allows the vehicle driver to focus on steering the vehicle instead of on retaining a seated position. Also, the seats can be inflated/deflated as appropriate for safety. For example, the seats can be moved into upright position and the air support in the seats deflated to move the driver and other occupants deeper into their seats. In the event of a roll over or crash, the seat belts are already at high tension (and may get even tighter), securing the vehicle occupants in their "body-contoured" seats. Thus, injuries can be avoided or minimized.

Time to collision to forward vehicle: Distance stability-regulating systems determine distances to objects in the vehicle environment. Using stability-regulating systems in combination with or supported by additional functionalities of distance alert systems is desirable. For example, if the distance to another object gets too short, the driver is warned and, with active systems, the vehicle speed is automatically decreased. Such deceleration will cause the same reaction as any other longitudinal deceleration. In order to prevent injuries and distractions, the seat belt tension is increased along with the triggering of the warning signal (and possible automatic deceleration). Seating positions can also be adjusted in anticipation of additional vehicle deceleration. Automatic application of seat belt tension also acts as an additional warning to alert the driver. If the system determines the point of no return (i.e., a frontal crash is unavoidable), the driver's seat (and, desirably, the passenger seats as well) is moved to its extreme rear position to maintain the greatest possible distance from the steering wheel and the windshield.

In addition to the continuous signal values discussed above, discrete signals can also be evaluated by the electronic interface to control the secondary safety components. Examples of such discrete signals include distance alert signals (which can be used as a substitute for time to collision to forward vehicle), yaw brake control signals (which can substitute for slip angle values), yaw engine control signals (which also can substitute for slip angle values), roll brake control signals (which can substitute for lateral acceleration values), roll engine control signals (which also can substitute for lateral acceleration values), brake light signals (which can substitute for longitudinal deceleration values) and lane departure warning signals.

As discussed in greater detail below, a variety of activation strategies for use by the electronic interface are contemplated by the present invention. For example, where the vehicle stability-regulating system is an ESC system and a secondary safety component is a seat belt tightener, the electronic interface can signal the seat belt tightener to adjust seat belt tension depending on the situation and based on one or more of the variables. Preferably, the seat belt tension will be adjusted in proportion to the trigger signal. In an easier to implement but potentially uncomfortable embodiment, the seat belt tension can be incrementally increased in a stepwise fashion in two or more different steps. The trigger thresholds can be determined based on the specific vehicle and application. Some variable thresholds are general—for example, it is known that a given degree of longitudinal deceleration becomes uncomfortable for vehicle occupants.

Figure 4:
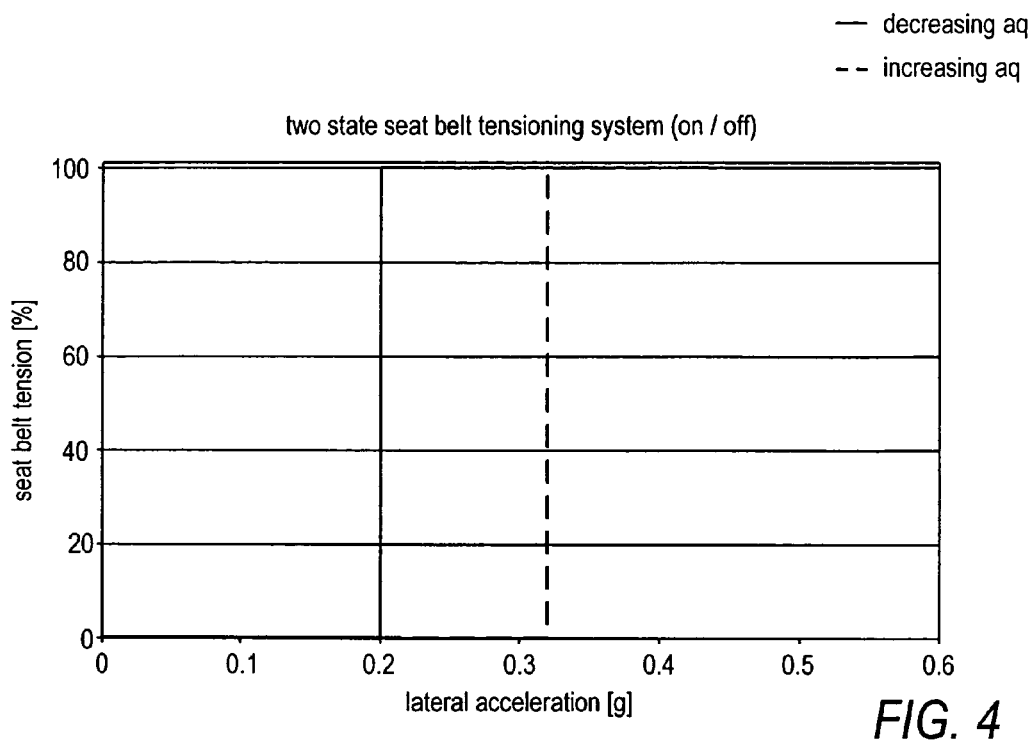
FIG. 4 is a graph illustrating a control scheme in which seat belt tightness is regulated between a normal and a safety condition based on the lateral acceleration of the vehicle in accordance with one embodiment of the present invention.

Referring now to FIG. 4, the seat belt tightener safety system can have two states, on and off, which are triggered by one preset threshold. The seat belt tension can be raised to one hundred percent when the lateral acceleration ($a_q$) reaches a threshold, for example, 0.32 g, and released when the lateral acceleration ($a_q$) falls below another threshold, for example, 0.2 g. This stability-regulating system is simple to implement, but offers lower comfort and safety than more sophisticated regulation schemes. Examples of other variable thresholds that can be used to control the seat belt tightener include a slip angle greater than ten percent, a yaw rate greater than eighty degrees and a longitudinal deceleration greater than 0.5 g.

Figure 5:
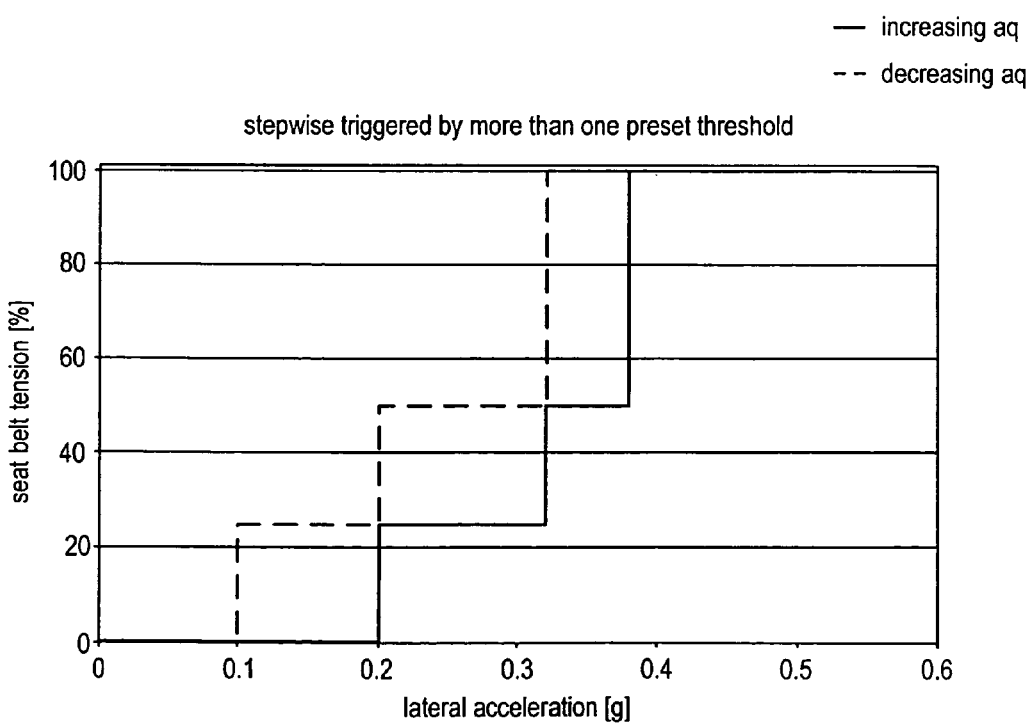
FIG. 5 is a graph illustrating a control scheme in which seat belt tightness is regulated between three states based on the lateral acceleration of the vehicle in accordance with another embodiment of the present invention.

Referring to FIG. 5, the seat belt tightener safety system can have three states, off (normal), pretension (transitional) and on (safety), which are triggered by two lateral acceleration preset thresholds. This control scheme is more sophisticated than the scheme represented in FIG. 4 and provides better comfort and safety. As shown in FIG. 5, when a lateral acceleration of 0.2 g, for example, is observed, the seat belt is pre-tensioned (e.g., seat belt tension is set to twenty-five percent of maximum possible tension). The seat belt tension is increased incrementally when lateral acceleration values of 0.32 g and 0.4 g, for example, are presented. A lateral acceleration threshold of 0.32 g is preferable for truck applications as it has been determined that this is the lateral acceleration where trucks generally begin moving into rollover conditions. Alternatively, yaw rate, yaw angle and longitudinal deceleration signals can be used as thresholds. For example, stepwise increases in seat belt tension can be triggered by a yaw angle increase of twenty percent, a yaw rate increase of sixty degrees per second, or a longitudinal deceleration of 0.1 g.

Figure 6:
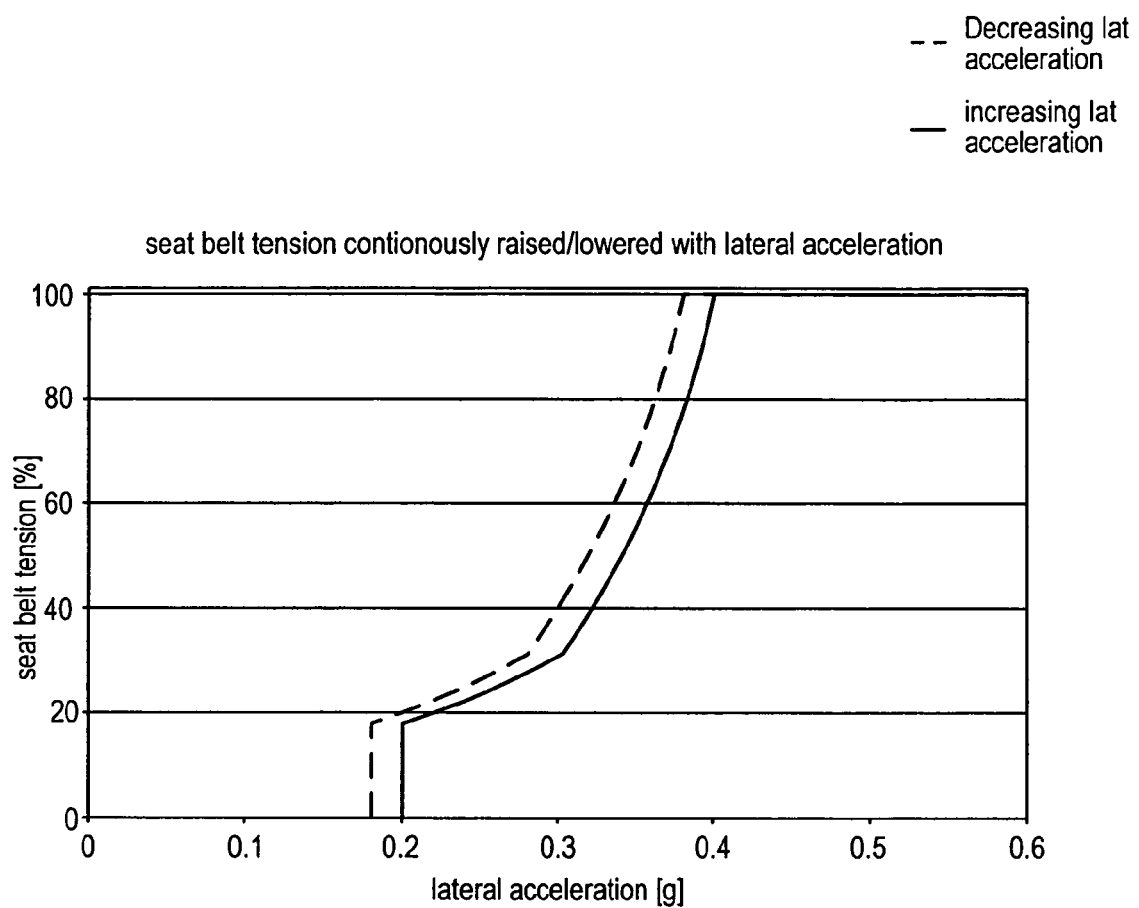
FIG. 6 is a graph illustrating a control scheme in which seat belt tightness is continuously adjusted based on the lateral acceleration of the vehicle in accordance with a further embodiment of the present invention.

Referring to FIG. 6, the seat belt tension can be continuously adjusted based on the input signal, in this case the lateral acceleration. This control scheme provides for maximum occupant comfort and safety. Yaw rate and yaw angle may also be used as suitable control variables. Since higher lateral accelerations or faster increase of yaw rates indicate a higher likelihood of severe conditions like roll over or loss of stability, the seat belt tension is increased in a non-linear fashion.

As discussed above, the threshold to activate the secondary safety components can be based on a variety of variables. These include, without limitation, the absolute value as well as the increase/decrease over time of lateral acceleration, vehicle yaw deviation, longitudinal deceleration, time to collision to forward vehicle, steering wheel angle and triggering of lane departure warning signals.

Activation of the inventive vehicle safety system can come in at least three tiers or modes. The lowest tier is "stand-by," where the vehicle and occupants are safe, but on alert. In stand-by mode the seat belt tension can be raised to a low level to alert the driver and other occupants of a possibly dangerous situation and other safety systems may be moved into a pre-application state. At this point, occupant comfort is more important than safety, so the seat belt force is low and there is no seat hardening or movement.

The second tier is activated where the vehicle is still stable, but, due to the increasing risk of accident, occupant comfort is no longer the primary consideration. Seat cushioning is hardened to support the occupants and the seats and headrests are fully locked into position.

The third tier is "point of no return," where the vehicle is close to a loss of control and an accident is likely imminent or unavoidable. At this point, all available safety features should be activated, without regard to occupant comfort. For example, the seats are moved rearward and into upright safe position, the seats are formed to a body-contoured shape and the seat belts are tightened to the maximum degree possible.

Table 1 provides exemplary thresholds for various control variables to trigger stand-by, activated and point of no return conditions. It should be appreciated that these thresholds can be adjusted according to the specific vehicle and application.

TABLE 1

|  | stand-by mode | activated mode | point of no return mode |
|---|---|---|---|
| lateral acceleration ($a_q$) | $a_q < 0.2$ g | $0.2$ g $< a_q < 0.4$ g and $\delta a_q < 1$ g/s and t $< 1$ s | $a_q > 0.4$ g or $\delta a_q > 1$ g/s or t $> 1$ s $\Delta a_q > 0$ with roll brake control active |
| longitudinal deceleration ($a_l$) | $a_l < 0.1.5$ g | $0.15$ g $< a_l < 0.5$ g and $\delta a_l < 1$ g/s | $a_l > 0.5$ g or $\delta a_l > 1$ g/s |
| brake pedal position (BP) | BP $< 30\%$ | $30\% <$ BP $< 50\%$ | BP $> 50\%$ |
| time to collision to forward vehicle | $>10$ s | $10$ s $> t > 5$ s | $<5$ s |
| yaw rate increase (YR) | YR $< 3°/s^2$ | $3°/s^2 <$ YR $< 7°/s^2$ | YR $> 7°/s^2$ |
| slip angle ($\beta$) | $\beta < 5\%$ | $5\% < \beta < 10\%$ | $\beta < 10\%$ $\Delta\beta > 0$ with yaw brake control active |
| steering wheel angle ($\delta\alpha$) | $\delta\alpha < 50°/s$ | $50°/s < \delta\alpha < 100°/s$ | $\delta\alpha > 100°/s$ |
| lane departure warning signal | active $< 1$ s | active $> 1$ s | active $> 2$ s |
| distance alert signal |  | active |  |
| yaw brake control signal |  | active $< 0.5$ s | active $> 0.5$ s |
| yaw engine control signal | active $< 2$ s | active $> 2$ s |  |
| roll brake control signal |  | active $< 0.5$ s | active $> 0.5$ s |
| roll engine control signal | active $< 2$ s | active $> 2$ s |  |

The following is a formula that can be used for controlling the seat belt tensioning force based on the lateral acceleration:

$$F_{seatbelt} = (|a_q| \geq 0.2 \text{ g}) \times ((|a_q| < 0.3 \text{ g}) \times 250^{|a_q|} + (|a_q| < 0.4 \text{ g}) \times (|a_q| \geq 0.3 \text{ g}) \times 100{,}000^{|a_q|}) + (|a_q| \geq 0.4 \text{ g}) \times 100$$

Where:

$F_{seatbelt}$=Seat Belt Tensioning Force [%] (100%=maximum possible/allowed seat belt force)

$|a_q|$=lateral acceleration [g](absolute value–direction left or right insignificant)

Preferably, a hysteresis of ~0.2 g is maintained for seat belt force release. It may be desirable to increase the calculated force over time when one of the trigger signals is maintained for a longer time period. If the trigger signal increases faster than determined in the list, for example 0.1 g/s for the lateral acceleration, the system will recognize the point of no return condition and immediately set the seat belt tension to one hundred percent.

The following is a formula that can be used for controlling the seat belt tensioning force based on the longitudinal acceleration (deceleration):

$$F_{seatbelt} = ((-a_l) \geq 0.15 \text{ g}) \times \frac{250^{(-a_l)}}{27.464} \times ((-a_l) < 0.5 \text{ g}) + ((-a_l) \geq 0.5 \text{ g}) \times 100$$

Where:

$F_{seatbelt}$=Seat Belt Tensioning Force [%] (100%=maximum possible/allowed seat belt force)

$a_l$=longitudinal acceleration [g]

Preferably, a hysteresis of ~0.1 g is maintained for seat belt force release.

Figure 7:
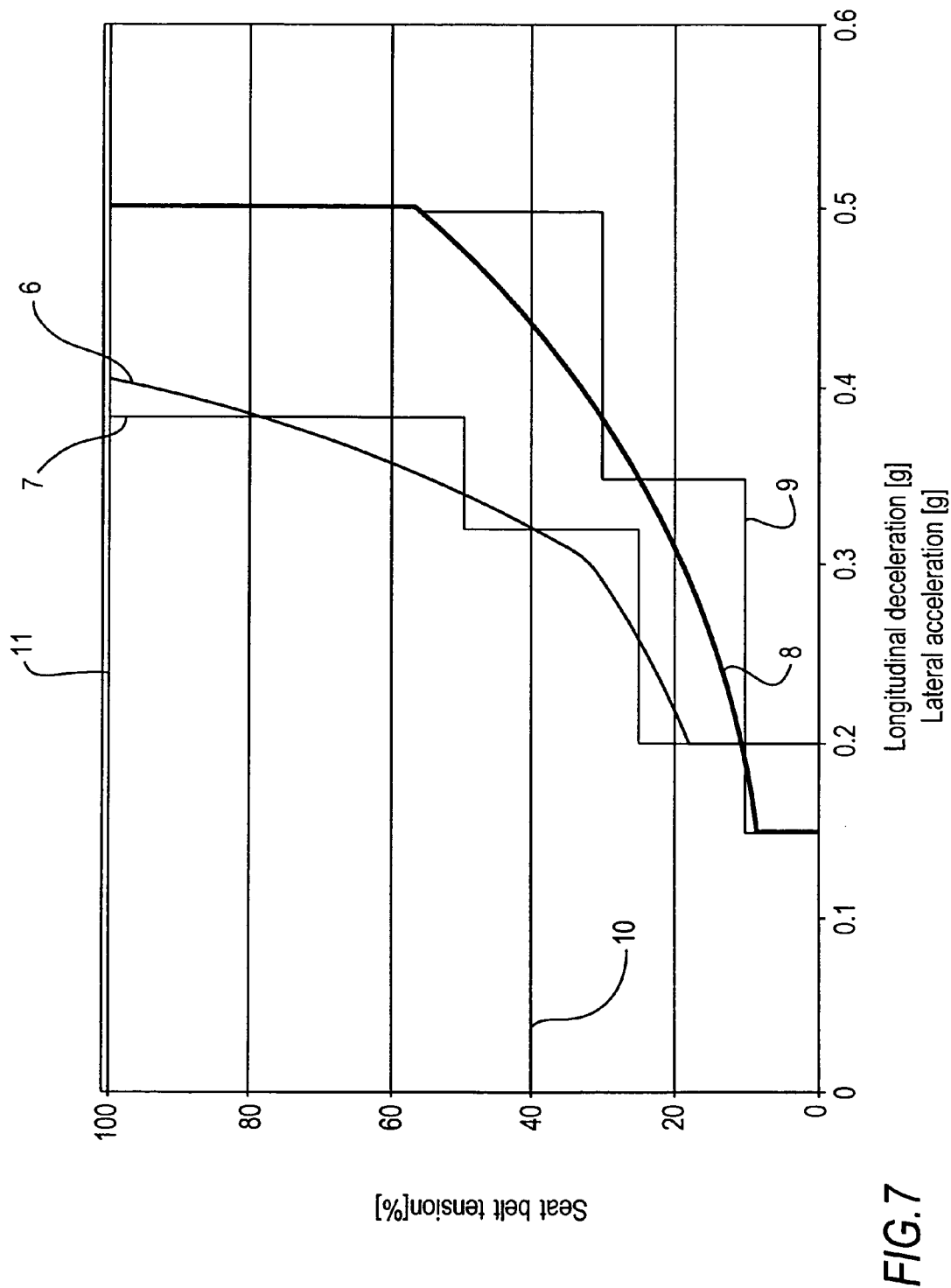
FIG. 7 is a graph illustrating a variety of possible control schemes in accordance with other embodiments of the present invention.

FIG. 7 illustrates additional exemplary variations of how secondary safety component 3a can be switched from normal condition into safety condition.

In a first exemplary variation according to FIG. 7, secondary safety component 3a can be switched continuously from the normal condition into the safety condition. More specifically, electronic interface 4a regulates the seat belt tightness continuously by means of the seat belt tighteners based on the lateral acceleration of the vehicle. Curve 6 represents the seat belt tightness (the y-axis, shown as a percentage of the maximum possible tightness) as a function of the lateral acceleration of the vehicle (x-axis, shown in units of g). According to this first exemplary variation, when the lateral acceleration of the vehicle exceeds a specified threshold, in this example approximately 0.20 g, the seat belts transition out of the normal condition and begin to tighten. The seat belt tightness increases continuously as the lateral acceleration increases over this threshold until the tightness reaches its maximum value (in this example, when the lateral acceleration exceeds approximately 0.4 g).

In a second exemplary variation, electronic interface 4a controls the seat belt tightness with a discrete staircase function. This approach is shown in FIG. 7 by curve 7, which represents the seat belt tightness as a function of the lateral acceleration.

In a third exemplary variation, electronic interface 4a regulates the seat belt tightness as a dependent function of the longitudinal deceleration of the vehicle (x-axis, in units of g). This function is shown as curve 8 in FIG. 7. According to this exemplary variation, when the longitudinal deceleration of the vehicle exceeds a specified threshold, the seat belt tightness is increased to a preselected value, after which it increases continuously as a function of the longitudinal deceleration until a further threshold value is exceeded, whereupon the seat belt tightness is set to the maximum value.

In a fourth exemplary variation, electronic interface 4a controls the seat belt tightness as a stepwise function of the longitudinal deceleration of the vehicle. This function is illustrated by curve 9 in FIG. 7.

According to a fifth exemplary variation, electronic interface 4a effects an increase in the seat belt tightness to at least forty percent in response to a positive distance warning signal. This approach is illustrated by curve 10 in FIG. 7.

According to a sixth exemplary variation, electronic interface 4a is programmed to increase the seat belt tightness to its maximum upon deactivation of the stability regulator, for example due to a malfunction. This approach is illustrated by curve 11 in FIG. 7.

As discussed above, the vehicle stability-regulating system reads data from different vehicle integrated sensors such as wheel speed, lateral acceleration, vehicle yaw and steering wheel angle. The sensor signals are conditioned and the data integrity validated to ensure reliable data. Desirably, several fault detection mechanisms check for correct sensor signals. This sensor signal conditioning is commonly employed for ABS and stability control functions as well as driver assist systems. Based on the conditioned vehicle stability-regulating system data, the electronic interface controls the secondary safety components using a scheme such as the exemplary schemes discussed above.

As discussed above, the vehicle stability-regulating system communicates with the secondary safety components. This data communication can be accomplished with at least three different configurations: (i) discrete communication and electronic activation, (ii) intelligent secondary safety components and (iii) activation by advanced vehicle stability-regulating system.

FIG. 1 illustrates an embodiment of the safety system of the present invention which utilizes a discrete communication and electronic activation configuration. Here, electronic interface 4a is shown as a separate electronic device from stability-regulating system 2a and secondary safety component 3a.

Desirably, the vehicle stability-regulating system transmits the conditioned data via the J1939 standard or through a CAN data bus. Electronic interface 4a reads data from the vehicle stability-regulating system, compares the values against the thresholds discussed above and controls an output to activate the secondary safety components. The control signal depends on the activators used at the secondary safety components. For example, a pneumatic activator can be used with two 2/2 way valves or a proportional valve as a controlling device controlled by voltage or current. Alternatives can include a step motor or a solenoid valve as well as hydraulic pressure.

It should be understood that a variety of signal formats and standards other than those specified in SAE J1939-71 can be utilized.

Figure 2:
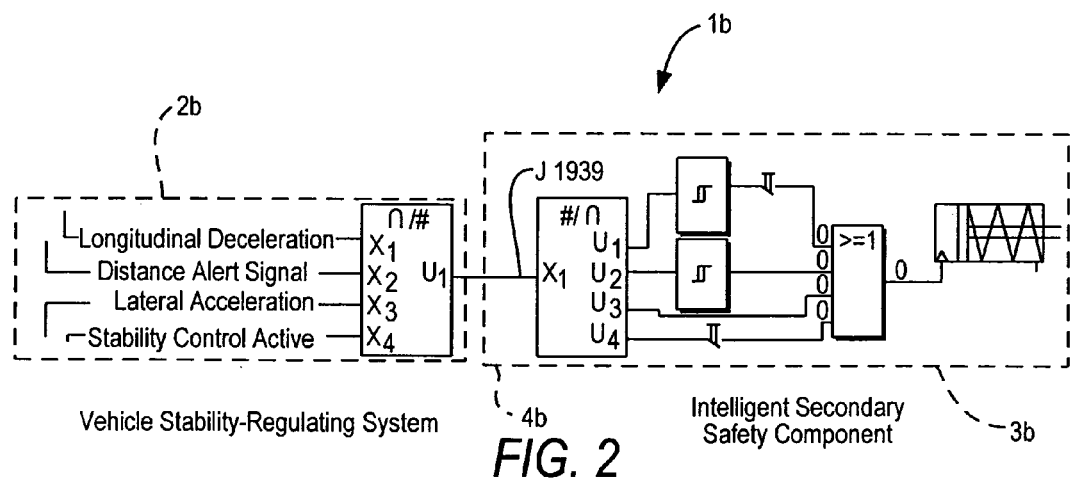
FIG. 2 is a schematic diagram of a vehicle safety system in accordance with another embodiment of the present invention in which the electronic interface is integrated into a secondary safety component.

FIG. 2 illustrates an embodiment of the intelligent secondary safety component configuration. Electronic interface 4b can be integrated into secondary safety component 3b. According to this embodiment, vehicle safety system 1b is generally the same as safety system 1a in FIG. 1 in that it has a vehicle stability-regulating system 2b (here an ESC), a secondary safety component 3b and an electronic interface 4b. In this embodiment, however, electronic interface 4b is integrated into secondary safety component 3b. The intelligent secondary safety component reads the conditioned data from the vehicle stability-regulating system (desirably, via the J1939 standard or a CAN data bus), compares the values against the thresholds and controls the safety component activator internally.

Figure 3:
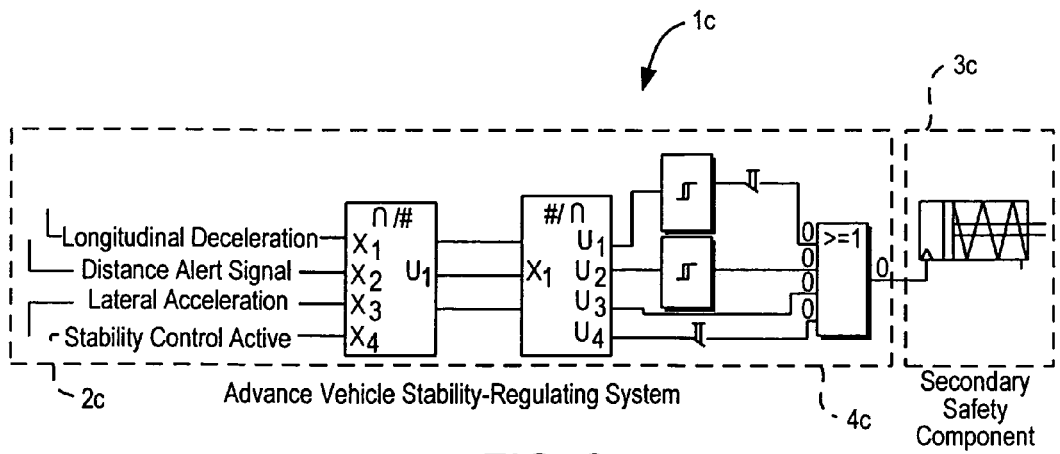
FIG. 3 is a schematic diagram of a vehicle safety system in accordance with a further embodiment of the present invention in which the electronic interface is integrated into the vehicle's stability-regulating system.

FIG. 3 illustrates an embodiment of the activation by advanced vehicle stability-regulating system configuration. According to this embodiment of the present invention, safety system 1c is generally the same as safety system 1a in FIG. 1 in that it has a stability-regulating system 2c, a secondary safety component 3c and an electronic interface 4c. In contrast to embodiments 1a and 1b, however, electronic interface 4c is integrated into the vehicle stability-regulating system 2c. All three operations 1) signal conditioning, 2) threshold comparison and 3) secondary safety component activation signal creation are included in the advanced vehicle stability-regulating system. The vehicle stability-regulating system creates a modulated pressure signal as described in the discrete communication and electronic activation embodiment and activates the secondary safety component based on the internal calculation and decision. Activation of the secondary safety component is proportional to the pressure signal level. The pressure signal level need be the only communication between the advanced vehicle stability-regulating system and the secondary safety component. It should be understood that the activator for the secondary safety component can also be controlled based on forces other than pressure, for example, electric, hydraulic or spring forces.

As indicated above, stability-regulating system 2a, 2b or 2c records, filters, converts and calculates relevant variables. In electronic interface 4a, 4b or 4c these regulating variables are compared against preselected limits (or combinations of limits). Electronic interface 4a, 4b or 4c can provide continuous or stepwise control of secondary safety component 3a, 3b or 3c. When an upper limit or combination of variables indicating a hazardous condition and/or "no return" situation is detected, the highest regulating step is preferably initiated, meaning, for example, that the seat belts are tightened to the maximum extent and locked and the seats are moved to a safe seat position and anchored. Situations with a smaller danger potential may trigger a less than maximum response or a "stand-by" situation, wherein the secondary safety components are prepared for rapid activation and a warning signal is sent to the driver.

The electronic interface utilized in accordance with the present invention preferably includes a CAN handler/transceiver, a controller and an output driver. The CAN handler and controller can be one integrated device such as provided by, for example, a FUJITSU MB90F497. The controller offers CAN input to read data off the CAN bus, analog and digital input as well as analog and digital output ports. Alternatively, a PEAK PCAN-MicroMod offers a complete device with output drivers. Each of the foregoing devices can be programmed using a C-compiler.

Thus, the present invention provides a vehicle safety system which improves occupant safety by employing an electronic interface which utilizes data from one or more preexisting vehicle stability-regulating systems to set the operating condition of one or more secondary safety components.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A safety system for a vehicle, the system comprising a stability-regulating system, at least one secondary safety component, and an electronic interface in operative communication with both said stability-regulating system and said at least one secondary safety component, said at least one secondary safety component being adapted to occupy at least a normal state, a lower transitional state, a higher transitional state, and a safety state, said lower transitional state and said higher transitional state being between said normal state and said safety state, said electronic interface being adapted to direct said at least one secondary safety component to occupy said lower transitional state when regulating variable data received from said stability-regulating system is between a first threshold and a second threshold and to occupy said higher transitional state when said regulating variable data is between said second threshold and a third threshold.

2. The safety system according to claim 1, wherein said stability-regulating system comprises at least one of an ESC system, an ABS, a CMS, an LDW system, an RSC system, a distance stability-regulating system, and a TPM system.

3. The safety system according to claim 1, said regulating variable data further comprising at least one of longitudinal acceleration, lateral acceleration, distance to another object, time to collision with another object, slip angle, yaw, yaw rate, steering angle, lane departure warning signals, brake control signals, engine control signals, brake light signals, activation of a stability regulator, and functional status of said stability-regulating system.

4. The safety system according to claim 1, wherein said vehicle comprises at least one seat, and said at least one secondary safety component comprises a seat belt and a seat belt tightener.

5. The safety system according to claim 1, wherein said vehicle comprises at least one seat, and said at least one secondary safety component comprises a seat position adjuster.

6. The safety system according to claim 1, wherein said vehicle comprises at least one seat, and said at least one secondary safety component comprises a seat inflater/deflater.

7. The safety system according to claim 1, wherein said electronic interface is integrated into said stability-regulating system.

8. The safety system according to claim 1, wherein said electronic interface is integrated into said at least one secondary safety component.

9. The safety system according to claim 1, said first threshold being associated with said normal state and said lower transitional state, said second threshold being associated with said lower transitional state and said higher transitional state, said third threshold being associated with said higher transitional state and said safety state, wherein said electronic interface is further adapted to effect a transition of said at least one secondary safety component from said normal state to said lower transitional state, from said lower transitional state to said higher transitional state, and from said higher transitional state to said safety state in a stepwise manner.

10. The safety system according to claim 1, wherein said electronic interface is further adapted to control said at least one secondary safety component to occupy a distance warning transitional state between said normal state and said safety state when said regulating variable data indicates a distance between said vehicle and an object being less than a predetermined distance, said distance warning transitional state being different from said lower transitional state and said higher transitional state.

11. The safety system according to claim 1, said at least one secondary safety component being further adapted to occupy continuous states between said normal state and said safety state, and said electronic interface being further adapted to direct said at least one secondary safety component through each of said continuous states based on said regulating variable data.

12. The safety system according to claim 1, wherein said at least one secondary safety component comprises a seat belt tensioner and said regulating variable data comprises lateral acceleration, wherein said first threshold is approximately 0.2 g and said lower transitional state comprises said seat belt tensioner being tightened at a first percentage, and wherein said third threshold is approximately 0.4 g and said higher transitional state comprises said seat belt tensioner being tightened at a second percentage higher than said first percentage.

13. The safety system according to claim 1, wherein said at least one secondary safety component comprises a seat belt tensioner and said regulating variable data comprises longitudinal deceleration, wherein said first threshold is approximately 0.15 g and said lower transitional state comprises said seat belt tensioner being tightened at a first percentage, and wherein said third threshold is approximately 0.5 g and said higher transitional state comprises said seat belt tensioner being tightened at a second percentage higher than said first percentage.

14. In a vehicle including a stability-regulating system and at least one secondary safety component, said at least one secondary safety component being adapted to occupy at least a normal state, a lower transitional state, a higher transitional state, and a safety state, said lower transitional state and said higher transitional state being between said normal state and said safety state, a method for effecting occupant safety comprising the steps of communicating regulating variable data generated by said stability-regulating system to said at least one secondary safety component and controlling said at least one secondary safety component to occupy said lower transitional state when said regulating variable data is between a first threshold and a second threshold and to occupy said higher transitional state when said regulating variable data is between said second threshold and a third threshold.

15. The method according to claim 14, wherein said step of controlling said at least one secondary safety component comprises at least one of automatically tightening and loosening at least one seat belt of said vehicle.

16. The method according to claim 14, wherein said step of controlling said at least one secondary safety component comprises automatically adjusting a position of at least one seat of said vehicle.

17. The method according to claim 14, wherein said step of controlling said at least one secondary safety component comprises at least one of automatically inflating and deflating at least one seat of said vehicle.

18. The method according to claim 14, said first threshold being associated with said normal state and said lower transitional state, said second threshold being associated with said lower transitional state and said higher transitional state, said third threshold being associated with said higher transitional state and said safety state, said method further comprising controlling said at least one secondary safety component from said normal state to said lower transitional state, from said lower transitional state to said higher transitional state, and from said higher transitional state to said safety state in a stepwise manner.

19. The method according to claim 14, further comprising controlling said at least one secondary safety component to occupy a distance warning transitional state between said normal state and said safety state when said regulating variable data indicates a distance between said vehicle and an object being less than a predetermined distance, said distance warning transitional state being different from said lower transitional state and said higher transitional state.

20. The method according to claim 14, said said at least one secondary safety component being further adapted to occupy continuous states at least between said normal state and said safety state, said method further comprising controlling said at least one secondary safety component through each of said continuous states based on said regulating variable data.

* * * * *